Figure 3:
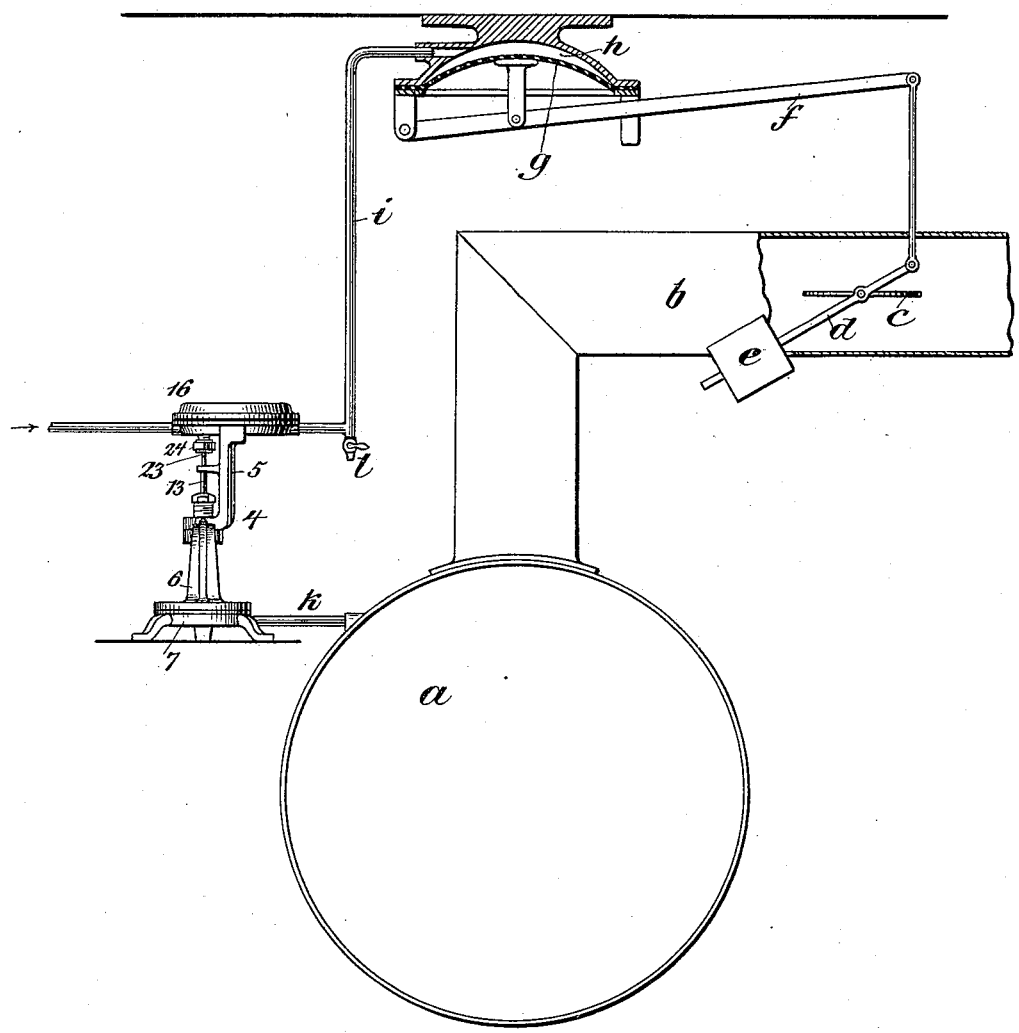

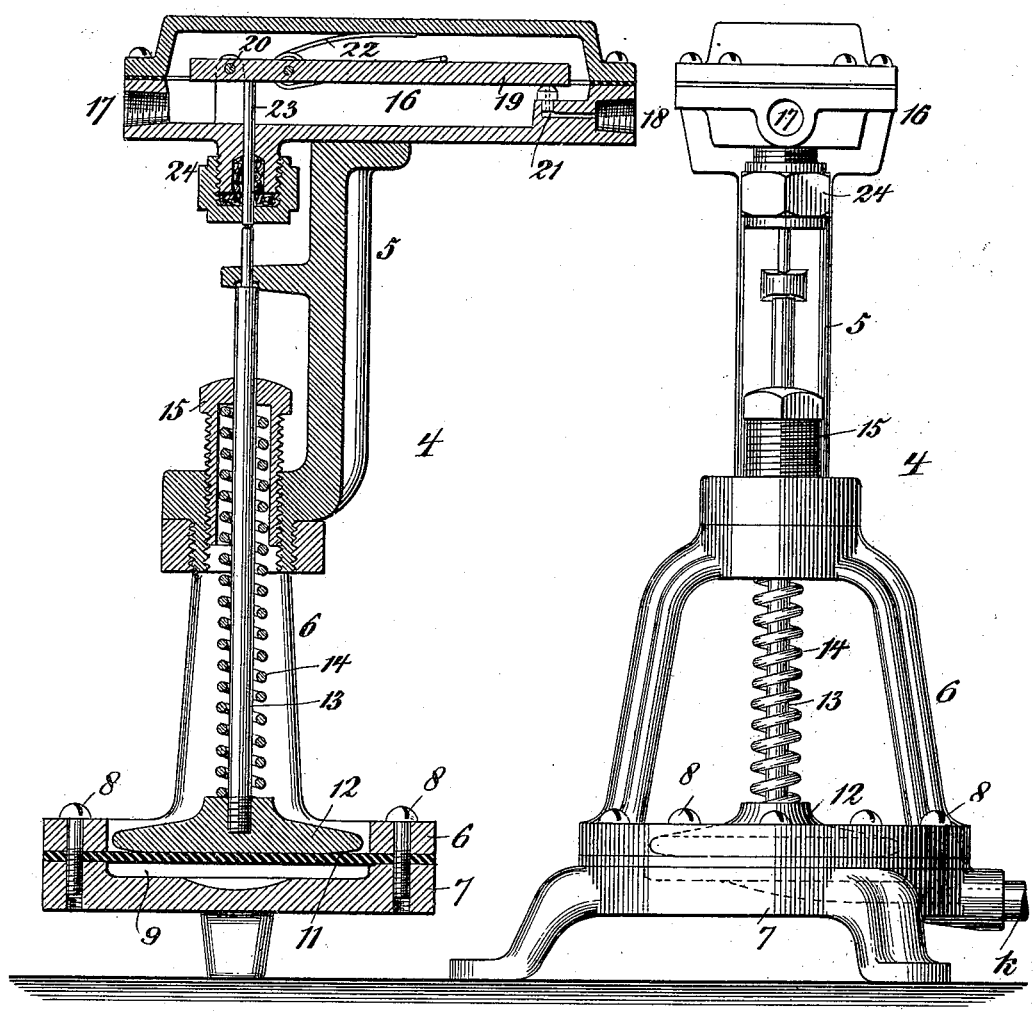

No. 662,094. Patented Nov. 20, 1900.
A. ROESCH.
PRESSURE GOVERNOR.
(Application filed Feb. 28, 1899.)
(No Model.) 2 Sheets—Sheet 2.

WITNESSES:

INVENTOR
Alfred Roesch

BY
ATTORNEY

UNITED STATES PATENT OFFICE.

ALFRED ROESCH, OF BRIDGEPORT, CONNECTICUT, ASSIGNOR TO THE DAVIS & ROESCH TEMPERATURE CONTROLLING COMPANY, OF NEW JERSEY.

PRESSURE-GOVERNOR.

SPECIFICATION forming part of Letters Patent No. 662,094, dated November 20, 1900.

Application filed February 28, 1899. Serial No. 707,147. (No model.)

*To all whom it may concern:*

Be it known that I, ALFRED ROESCH, a citizen of the United States of America, and a resident of Bridgeport, Fairfield county, Connecticut, have invented certain new and useful Improvements in Pressure-Governors, of which the following is a specification.

My invention relates to improvements in regulators in which variations in the pressure itself operate to automatically control the means by which said pressure may be regulated.

In the present form of my invention such means are shown as a damper, arranged in a flue rising from a heater, and an operating means for moving the damper, comprising a diaphragm-chamber and a diaphragm, and a valve for controlling the admission of motive fluid thereto.

The objects of my invention are to hold or maintain a pressure at a predetermined point automatically, to simplify the parts in a regulator, to lower the cost of construction of a device for such purpose, and to make such device extremely sensitive yet positive in its action.

I will now proceed to describe a regulator embodying my invention and will then point out the novel features in the claim.

Referring to the accompanying drawings, Figure 1 represents a central vertical section of a regulator embodying my improvement. Fig. 2 is a side elevation of the same. Fig. 3 represents a diagrammatic view illustrating a system in which my regulator may be employed.

Similar reference characters designate corresponding parts in all the figures.

Reference-numeral 4 designates a casing or support, for convenience constructed in three pieces 5, 6, and 7. The upper pieces 5 and 6 are secured together in the middle by a screw-threaded connection, as shown. The lowest part 7 of the casing is secured to the intermediate part 6 by screws 8. The part 7 is cored out at 9 to form a pressure-chamber, which will be in communication with the fluid under pressure which it is desired to regulate, as by a pipe $k$. 11 is a diaphragm arranged above said chamber and secured in position by having its edges clamped between the parts 6 and 7. 12 designates a follower, and 13 a follower-rod, said follower being adapted to bear against said diaphragm. 14 is a spring adapted to bear with a yielding pressure against the said follower to force same downwardly. Said spring is arranged around the said follower-rod, and its upper end is confined by an adjustable nut 15, by the adjustment of which a predetermined amount of pressure can be exerted on the spring and against the upward movement of the diaphragm and follower.

16 designates a valve-chest inclosing a chamber secured to the upper part of the section 5 of the casing 4. The said chamber has an outlet, as at 18.

19 is a pallet or valve pivoted within the chamber 16 at 20 and adapted to close a vent or passage 21, leading to the outlet 18. I have termed the particular form of valve shown a "pallet" or "pallet-valve," as a term most descriptive of it. It is similar in form to the pallet or pallet-valve employed in organs and which regulates the supply of air from the bellows to the organ-pipe controlled from the keyboard. The pallet or valve 19 is normally held closed by a spring 22. 23 is a rod located between the end of the follower-rod 13 and the said pallet or valve and passing through a stuffing-box 24 in order to prevent leakage of the fluid from the chamber 16.

From the above it follows that should the pressure in the diaphragm-chamber 9 exceed the pressure at which the spring 14 is set the follower and its rod will be lifted, and with it the rod 23. This will raise the pallet 19 and open the passage 21 to the incoming fluid.

The operation of the device in connection with a heating system may be best understood by reference to Fig. 3, in which $a$ is a heater, such as a boiler. $b$ is a flue leading from the furnace of same. $c$ is a damper located in said flue. $d$ is a lever adapted to throw said damper in one direction. $e$ is a counterbalance-weight adapted to return said damper to its "open" position. $f$ is a connecting-rod connecting same to a piston or diaphragm $g$. $h$ is a diaphragm-chamber connected to chamber 16 by the pipe $i$. $k$ is a pipe which leads from the fluid under pressure in the heater $a$ to the diaphragm-chamber 9. Now, therefore, assuming the inlet 17 to be connected to a water-supply at, say, city water-pressure then the raising of the pallet or valve, as above described, will permit the water to pass through the said chamber 16, through the vent 21 and outlet 18, and through the pipe $i$ to the diaphragm-chamber $g$. This will depress the diaphragm $g$, closing the damper $c$ against the weight of the counterbalance $e$. The damper will be held shut until the pressure in the heater $a$ falls below the pressure at which the spring 14 is set, when the said spring will lower the diaphragm 11, follower 12, and rod 13, permitting the pallet or valve 19 to close.

$l$ is a drip-cock which is arranged in the pipe $i$ and which is held normally open. When so open, however, the area of the opening is less than the area of the vent or passage 21. Hence though some water will escape therethrough, there will still be a sufficient head maintained to perform the required function. When the pallet closes the passage 21, so that no more water can pass through, the water left in the pipes and in the diaphragm-chamber $h$ will gradually escape through the drip-cock $l$. The diaphragm or piston $g$ is returned by the action of the counterbalance $e$, and the damper is again open.

The construction and arrangement of parts shown constitute an exceedingly efficient and simple device, one that may be readily and simply adjusted for different pressures, and one that is unlikely to get out of order.

The construction of the rod 23 and the rod 13 in two separate pieces prevents the possibility of the said rods binding in their bearings as might occur were they in one piece.

What I claim is—

The combination in a regulator of a casing or support constructed in three sections, a diaphragm-chamber arranged in the lowest section, a diaphragm arranged thereon and inclosing same, an intermediate section having an annular base adapted to be secured to the lowest section and to clamp the edges of the diaphragm, and having an arched structure rising from the annular base, an upper section secured to the upper end of the intermediate structure, a valve-chest secured upon the upper end of the upper section of the casing, a valve arranged in said valve-chest, a rod controlling in its movement the movement of the valve and passing out through the valve-chest, a follower and a follower-rod arranged between the diaphragm and the valve-controlling rod, the said follower guided in the casing and bearing loosely against the end of the valve-controlling rod, a coil-spring surrounding the follower-rod and bearing at one end against the follower, and an adjusting-nut mounted upon the casing and bearing against the opposite end of the coil-spring, substantially as specified.

Signed by me at New York, N. Y., this 9th day of February, 1899.

ALFRED ROESCH.

Witnesses:
JNO. S. PARKER,
HORACE S. GOULD.